US010349255B2

(12) United States Patent
Strobl

(10) Patent No.: US 10,349,255 B2
(45) Date of Patent: Jul. 9, 2019

(54) COMMUNICATION SYSTEM AND METHOD

(71) Applicant: Intel IP Corporation, Santa Clara, CA (US)

(72) Inventor: Stefan Strobl, Obermichelbach (DE)

(73) Assignee: Intel IP Corporation, Santa Clara, CA (US)

( * ) Notice: Subject to any disclaimer, the term of this patent is extended or adjusted under 35 U.S.C. 154(b) by 56 days.

(21) Appl. No.: 15/385,096

(22) Filed: Dec. 20, 2016

(65) Prior Publication Data

US 2018/0176887 A1    Jun. 21, 2018

(51) Int. Cl.
*H04W 4/90* (2018.01)
*H04W 8/18* (2009.01)
*H04W 76/16* (2018.01)
*H04W 4/06* (2009.01)
*H04W 76/40* (2018.01)
*H04W 4/60* (2018.01)

(52) U.S. Cl.
CPC ............... *H04W 4/90* (2018.02); *H04W 4/06* (2013.01); *H04W 8/183* (2013.01); *H04W 76/16* (2018.02); *H04W 76/40* (2018.02); *H04W 4/60* (2018.02)

(58) Field of Classification Search
CPC ..... H04W 72/005; H04W 72/10; H04W 4/22; H04W 4/90; H04W 76/026; H04W 76/16
See application file for complete search history.

(56) References Cited

U.S. PATENT DOCUMENTS

| | | | |
|---|---|---|---|
| 2015/0304989 A1* | 10/2015 | Zhu ................... | H04W 36/0066 370/252 |
| 2016/0205663 A1* | 7/2016 | Shauh ................ | H04W 60/005 370/312 |
| 2017/0055164 A1* | 2/2017 | Santhanam .......... | H04W 24/02 |
| 2017/0180951 A1* | 6/2017 | Lee ..................... | H04W 4/06 |
| 2017/0272925 A1* | 9/2017 | Rupanagudi Venkata ................. H04W 4/22 |
| 2017/0280507 A1* | 9/2017 | Wang .................. | H04L 5/0007 |
| 2018/0063880 A1* | 3/2018 | Bhardwaj ............ | H04W 76/19 |

* cited by examiner

*Primary Examiner* — Asad M Nawaz
*Assistant Examiner* — Saad A. Waqas
(74) *Attorney, Agent, or Firm* — Schiff Hardin LLP

(57) ABSTRACT

A communication method and device are described. The communication device can be a multi-subscriber identity module (SIM) communication device configured to communicate using a first SIM and a second SIM. In the communication method, a Multimedia Broadcast Multicast Service (MBMS) communication can be established using the first SIM. Further, whether the MBMS communication is prioritized over a second communication being initiated using the second SIM can be determined. The MBMS communication and the second communication can be managed based on the determination. The communication device can include a service priority determination processor that can determine whether the MBMS communication is prioritized over the second communication.

23 Claims, 7 Drawing Sheets

COMMUNICATION SYSTEM AND METHOD

BACKGROUND

Field

Aspects described herein generally relate to wireless communications in subscriber identity module (SIM) wireless communication, including prioritizing communication such as Multimedia Broadcast Multicast Services (MBMS) communications and/or Evolved Multimedia Broadcast Multicast Services (eMBMS) communications.

BRIEF DESCRIPTION OF THE DRAWINGS/FIGURES

The accompanying drawings, which are incorporated herein and form a part of the specification, illustrate the aspects of the present disclosure and, together with the description, further serve to explain the principles of the aspects and to enable a person skilled in the pertinent art to make and use the aspects.

The exemplary aspects of the present disclosure will be described with reference to the accompanying drawings. The drawing in which an element first appears is typically indicated by the leftmost digit(s) in the corresponding reference number.

DETAILED DESCRIPTION

Figure 1:
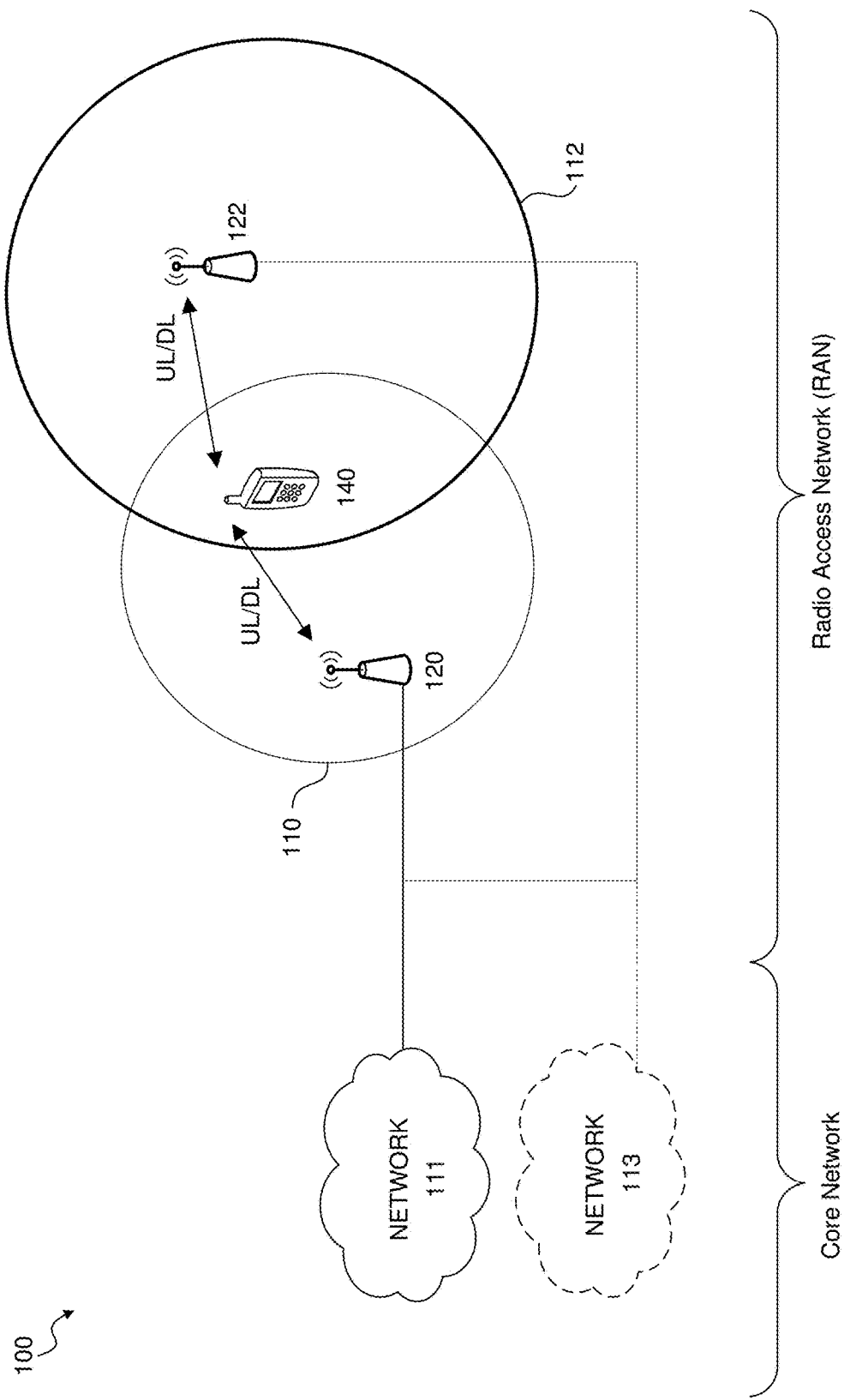
FIG. 1 illustrates an example network environment.

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

As an overview, mobile devices can include a subscriber identity module (SIM) configured to facilitate wireless communications via one or more wireless communication networks associated with the SIM. The SIM can be a physical SIM card in one or more exemplary aspects and can be removable or non-removable. The SIM is not limited to a physical card and can be a virtual SIM card realized as, for example, a software module in other aspects. In exemplary aspects, a mobile device can include multiple SIMs (e.g., two SIMs) configured for Dual-SIM Dual-Standby (DSDS) operation, Dual Receive (DR)-DSDS operation, and/or Dual-SIM caller identification (DSCID) operation. Unlike in Dual SIM-Dual Active (DSDA) configurations, the dual SIMs of DSDS/DR-DSDS devices share a single transmitter (i.e., DSDA include a transceiver for each SIM).

In a DSDS/DR-DSDS operation, both SIMs can be in a standby mode where each SIM can perform idle/camping services such as paging reception, decoding of paging, reselection, measurements, coverage searching, and/or one or more other services that do not require a transmitter. In operation, only one of the multiple SIMs can be in an active mode that utilizes the transmitter.

In an exemplary aspect, a mobile device supports Multimedia Broadcast Multicast Services (MBMS). For example, the mobile device can support Evolved Multimedia Broadcast Multicast Services (eMBMS) that deliver broadcast and multicast services using the Long-Term Evolution (LTE) protocol. Such eMBMS services can also be referred to as LTE broadcast. The Evolved Multimedia Broadcast Multicast Services (eMBMS) can be used to deliver, for example, mobile TV and radio broadcasting, live streaming video services, file delivery, emergency alerts, and/or other broadcast and multicast media as would be understood by one of ordinary skill in the relevant arts. The broadcast and multicast services can be delivered within a cell as well as within the core network. For broadcast transmission across multiple cells, a transmission via single-frequency network configurations can be used.

Unlike a typical unicast service, eMBMS does not utilize an uplink and uses only the receive capability of the mobile device. In DSDS/DR-DSDS configurations, eMBMS can restrict the alternative radio access technology (RAT)/SIM from entering an active mode/connected mode. That is, although the eMBMS does not utilize the uplink, eMBMS utilization of the downlink in an active mode operation results in the other SIM to be placed in the idle mode as the mobile device is unable to process both services of both SIMs without additional resources (processing power, memory, and/or additional hardware). In this example, without such a restriction, additional resources (processing power, memory, and/or additional hardware) would likely be needed similar to DSDA configurations.

In an exemplary aspect, the mobile device is configured to manage one or more prioritization policies to manage eMBMS prioritizations to allow the mobile device to prioritize eMBMS in multi-SIM (e.g., DSDS, DR-DSDS) configurations. For example, if a first SIM supporting an active eMBMS and a mobile terminated call (e.g., incoming voice call, incoming email, etc.) is paged by the network supported by a second SIM, the eMBMS communication utilizing the first SIM will be interrupted and/or dropped. That is, the eMBMS would be dropped to support a connected mode service on the other SIM.

To avoid this interruption for the eMBMS service, in an exemplary aspect, the mobile device can be configured to manage eMBMS service preferences to prioritize eMBMS over one or more connected mode services on one or more other SIMs in the DSDS/DR-DSDS configuration. In an exemplary aspect, the application processor and/or modem of the mobile device are configured to manage eMBMS service preferences without adding additional resources (processing power, memory, and/or additional hardware) and/or DSDA related hardware (e.g., another transceiver).

FIG. 1 illustrates an example communication environment 100 that includes a radio access network (RAN) and a core network. The RAN includes one or more base stations, such as base stations 120 and/or 122, and one or more mobile devices 140. The core network includes a backhaul communication network 111 and/or backhaul communication network 113. In an exemplary aspect, the backhaul communication networks 111 and/or 113 can include one or more well-known communication components—such as one or more network switches, one or more network gateways, and/or one or more servers. The backhaul communication networks 111 and/or 113 can include one or more devices and/or components configured to exchange data with one or more other devices and/or components via one or more wired and/or wireless communications protocols. In exemplary aspects, the base stations 120 communicate with one or more service providers and/or one or more other base stations 120 via the backhaul communication network 111. Similarly, the base station 122 communicate with the one or more service providers and/or one or more other base stations (e.g., 120) via the backhaul communication network 111. In this example, base stations 120 and base station 122 share the same backhaul communication network 111. In an alternative aspect, the base station 120 and the base station 122 are associated with different backhaul communications networks. For example, the base station 120 is associated with backhaul communications network 111 and the base station 122 is associated with backhaul communications network 113. In an exemplary aspect, the backhaul communication networks 111 and/or 113 are an internet protocol (IP) backhaul network. The backhaul communication network 111 and/or 113 can include one or more elements of an evolved packet core, including, for example, one or more Mobility Management Entities (MME), serving gateways (S-GW), public data network (PDN) gateways (P-GW), Home Subscriber Servers (HSS), Access Network Discovery and Selection Functions (ANDSF), Evolved Packet Data Gateways (ePDG), and/or one or more other core network components as would be understood by one of ordinary skill in the relevant arts.

The number of base stations 120 and/or 122, mobile devices 140, and/or networks 111 and/or 113 are not limited to the exemplary quantities illustrated in FIG. 1, and the communication environment 100 can include any number of the various components as would be understood by one of ordinary skill in the relevant art(s).

In an exemplary aspect, the base station 120, base station 122, and/or mobile device 140 each include processor circuitry that is configured to communicate via one or more wireless technologies. The mobile device 140 can be further configured to support co-existing wireless communications with the base station 120, and/or co-existing wireless communications with the base station 120 and the other base station 122, where the base station 120 supports one or more wireless communications and the base station 122 supports one or more other wireless communications.

In aspects where the mobile device 140 supports multiple wireless communications, including co-existing wireless communications, the mobile device 140 can include one or more subscriber identity modules (SIMs), where one or more SIMs of the multiple SIMs can support co-existing wireless communications on multiple wireless networks. For example, the mobile device 140 can include a single SIM that supports co-existing wireless communications on two or more wireless networks (e.g., single radio LTE (SRLTE)). In this example, the single SIM can be referred to as a multi-network SIM. In an exemplary aspect, the mobile device 140 can include multiple SIMs, where one or more of the multiple SIMs are multi-network SIMs.

In an exemplary aspect, the mobile device 140 can include two or more subscriber identity modules (SIMs) configured for Dual-SIM Dual-Standby (DSDS) operation, (DR)-DSDS operation, and/or Dual-SIM caller identification (DSCID) operation. For example, a first SIM can support wireless communications (e.g., 2G or 2G/3G) on a first wireless network (e.g. serving cell or sector 110 supported by base station 120) and a second SIM can support wireless communications (e.g., 2G/3G/4G) on a second wireless network (e.g., serving cell or sector 112 supported by base station 122). In an exemplary aspect, the wireless communications on the second wireless network includes LTE communications. In an exemplary aspect, the second SIM supports Multimedia Broadcast Multicast Services (MBMS), including Evolved Multimedia Broadcast Multicast Services (eMBMS) that deliver broadcast and multicast services through using LTE. The first and second networks can be supported by a single base station 120 or multiple base stations. That is, a single base station 120 can support both the first and the second wireless networks, or multiple base stations 120 can be implemented where a first base station supports the first wireless network and a second base station supports the second wireless network.

The mobile device 140, the base station 120, and/or base station 122 can each include a transceiver configured to transmit and/or receive wireless communications via one or more wireless technologies within the communication environment 100. In operation, the mobile device 140 can be configured to communicate with the base station 120 in serving cell or sector 110 of the communication environment 100 and/or with the base station 122 in serving cell or sector 112 of the communication environment 100. For example, the mobile device 140 receives signals on one or more downlink (DL) channels from the base station 120 and/or base station 122, and transmits signals to the base station 120 and/or the base station 122 on one or more respective uplink (UL) channels. Although FIG. 1 illustrates that the cell/sectors 110 and 112 are supported by different base stations 120 and 122, respectively, one or more exemplary aspects can include a base station that supports both cells/sectors 110 and 112. In this example, the mobile device 140 communicates to the base station via one or more both of the cells/sectors 110 and 112. Further, the number of cells/sectors supported by an individual base station are not limited to two cells/sectors 110 and 112, and the base station can support additional cells/sectors in one or more aspects than those illustrated in FIG. 1.

Examples of the mobile device 140 include (but are not limited to) a mobile computing device—such as a laptop computer, a tablet computer, a mobile telephone or smartphone, a "phablet," a personal digital assistant (PDA), and mobile media player; and a wearable computing device—such as a computerized wrist watch or "smart" watch, and computerized eyeglasses. In some aspects of the present disclosure, the mobile device 140 may be a stationary device, including, for example, a stationary computing device—such as a personal computer (PC), a desktop computer, a computerized kiosk, and an automotive/aeronautical/maritime in-dash computer terminal.

Figure 2:
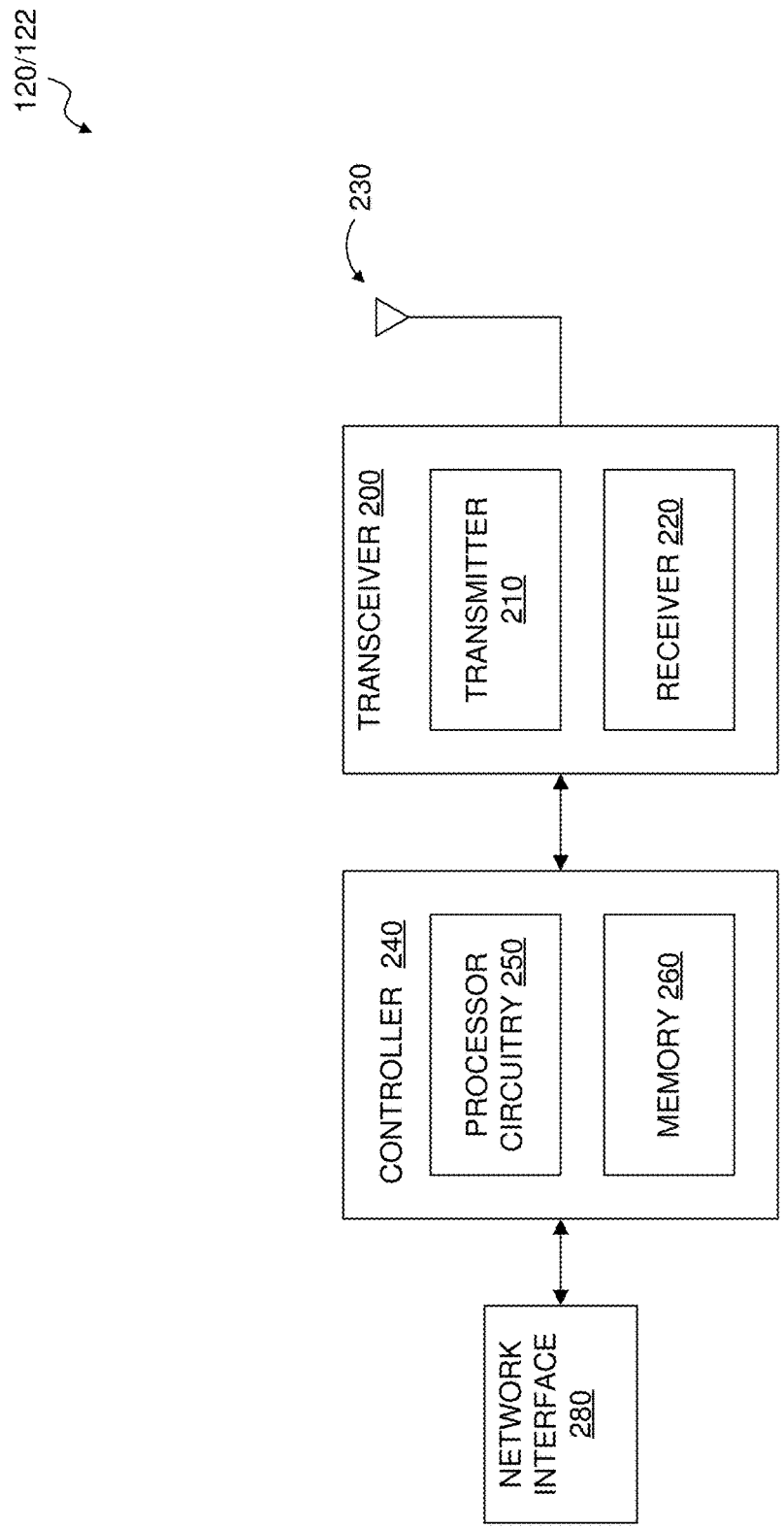
FIG. 2 illustrates a base station according to an exemplary aspect of the present disclosure.

FIG. 2 illustrates the base station 120 and/or base station 122 according to one or more exemplary aspects of the present disclosure. For example, the base station 120 and/or the base station 122 can include a transceiver 200 and a network interface 280, each communicatively coupled to controller 240.

The transceiver 200 includes processor circuitry that is configured to transmit and/or receive wireless communications via one or more wireless technologies within the communication environment 100. For example, the transceiver 200 can include one or more transmitters 210 and one or more receivers 220 that configured to transmit and receive wireless communications, respectively, via one or more antennas 230. Those skilled in the relevant art(s) will recognize that the transceiver 200 can also include (but is not limited to) a digital signal processer (DSP), modulator and/or demodulator, a digital-to-analog converter (DAC) and/or an analog-to-digital converter (ADC), an encoder/decoder (e.g., encoders/decoders having convolution, tail-biting convolution, turbo, Viterbi, and/or Low Density Parity Check (LDPC) encoder/decoder functionality), a frequency converter (including mixers, local oscillators, and filters), Fast-Fourier Transform (FFT), precoder, and/or constellation mapper/de-mapper that can be utilized in transmitting and/or receiving of wireless communications. Further, those skilled in the relevant art(s) will recognize that the antenna 230 may include an integer array of antennas, and that the antenna 230 may be capable of both transmitting and receiving wireless communication signals.

In an exemplary aspect, the transceiver 200 is configured for wireless communications conforming to one or more wireless communication protocols supporting one or more wireless communication networks. For example, the transceiver 200 can support the first and the second communication networks associated with the first and second SIM cards in aspects where the base station 120/122 supports both cells/sectors 110/112. In other aspects, the transceiver 200 for base station 120 supports one of the first and the second communication networks while the transceiver 200 for the base station 122 supports the other communication network. The base station 120 and/or the base station 122 can include multiple transceivers 200 in one or more exemplary aspects. In this example, a first transceiver 200 can support the first communication network while a second transceiver 200 supports the second communication network.

In an exemplary aspect, transceiver 200 supports the Long-Term Evolution (LTE) protocol. In this example, the transceiver 200 can be referred to as LTE transceiver 200. Those skilled in the relevant art(s) will understand that the transceiver 200 is not limited to LTE communications, and can be configured for communications that conform to one or more other protocols in addition to or alternatively to the LTE protocol.

The network interface 280 includes processor circuitry that is configured to transmit and/or receive communications via one or more wired technologies to/from the backhaul communication network 111 and/or 113. Those skilled in the relevant art(s) will recognize that the network interface 280 can also include (but is not limited to) a digital signal processer (DSP), modulator and/or demodulator, a digital-to-analog converter (DAC) and/or an analog-to-digital converter (ADC), and/or a frequency converter (including mixers, local oscillators, and filters) to provide some examples. Further, those skilled in the relevant art(s) will understand that the network interface 280 is not limited to wired communication technologies and can be configured for communications that conform to one or more well-known wireless technologies in addition to, or alternatively to, one or more well-known wired technologies.

The controller 240 can include processor circuitry 250 that is configured to carry out instructions to perform arithmetical, logical, and/or input/output (I/O) operations of the base station 120 and/or 122, and/or one or more components of the base station 120 and/or 122. The processor circuitry 250 can be configured control the operation of the transceiver 200—including, for example, transmitting and/or receiving of wireless communications via the transceiver 200, and/or perform one or more baseband processing functions (e.g., media access control (MAC), encoding/decoding, modulation/demodulation, data symbol mapping, error correction, etc.). In an exemplary aspect, the controller 240 can include one or more elements of a protocol stack such as, for example, elements of an evolved universal terrestrial radio access network (EUTRAN) protocol—including, for example, physical (PHY) layer, media access control (MAC), radio link control (RLC), packet data convergence protocol (PDCP), and/or radio resource control (RRC) elements. The Non Access Stratum (NAS) is the protocol between the mobile device (UE) and the Mobility Management Entity (MME) and can be configured for authentication operations, security control and/or the generation of paging messages.

The controller 240 can further include a memory 260 that stores data and/or instructions, where when the instructions are executed by the processor circuitry 250, controls the processor circuitry 250 to perform the functions described herein. The memory 260 can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory 260 can be non-removable, removable, or a combination of both.

Figure 3A:
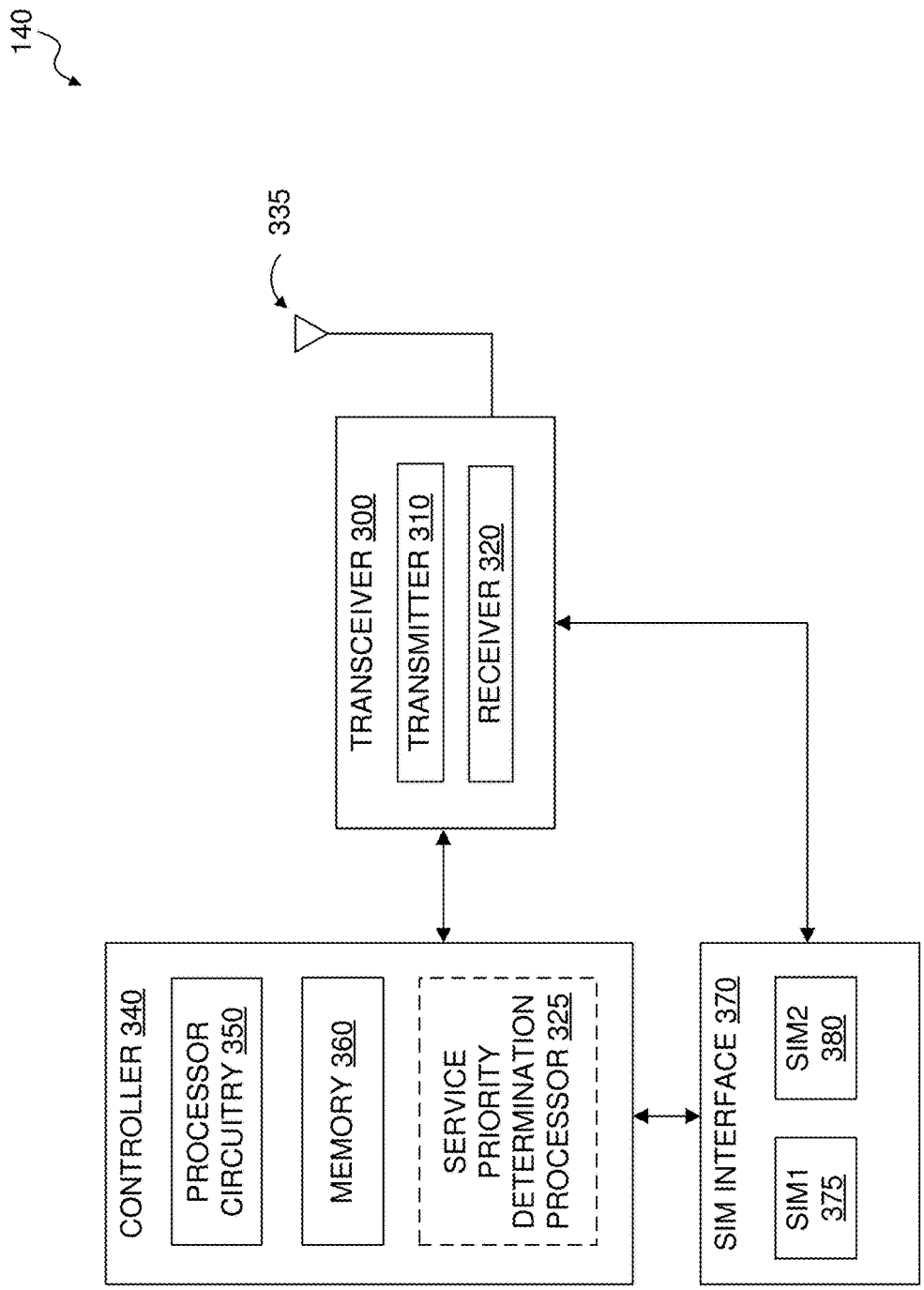
FIGS. 3A-4 illustrate mobile devices according to an exemplary aspects of the present disclosure.

FIG. 3A illustrates the mobile device 140 according to an exemplary aspect of the present disclosure. The mobile device 140 can include controller 340 communicatively coupled to one or more transceivers 300 configured to transmit and/or receive wireless communications via one or more wireless technologies within the communication environment 100. In an exemplary aspect, the mobile device 140 includes a SIM interface 370 configured to interface with one or more SIMs. In an exemplary aspect, the SIM interface 370 is a dual-SIM interface configured to interface with a first SIM 375 and a second SIM 380, but is not limited thereto (e.g., the mobile device 140 may have less or more SIMs in other aspects). Each of the SIMs can be configured to support one or more wireless communication networks. For example, a SIMs can be a single-network SIMs or a multi-network SIMs. The mobile device 140 can include one or more single-network SIMs, one or more multi-network SIMs, or a combination of both.

The transceiver 300 can include processor circuitry that is configured for transmitting and/or receiving wireless communications conforming to one or more wireless protocols. For example, the transceiver 300 can include a transmitter 310 and a receiver 320 configured for transmitting and receiving wireless communications via one or more antennas 335.

In exemplary aspects, the transceiver 300 can include (but is not limited to) a digital signal processer (DSP), modulator and/or demodulator, a digital-to-analog converter (DAC) and/or an analog-to-digital converter (ADC), an encoder/decoder (e.g., encoders/decoders having convolution, tail-biting convolution, turbo, Viterbi, and/or Low Density Parity Check (LDPC) encoder/decoder functionality), a frequency converter (including mixers, local oscillators, and filters), Fast-Fourier Transform (FFT), precoder, and/or constellation mapper/de-mapper that can be utilized in transmitting and/or receiving of wireless communications. Further, those skilled in the relevant art(s) will recognize that antenna 335 may include an integer array of antennas, and that the antennas may be capable of both transmitting and receiving wireless communication signals.

The controller 340 can include processor circuitry 340 that is configured to control the overall operation of the mobile device 140, such as the operation of the transceiver 300—including, for example, transmitting and/or receiving of wireless communications via the transceiver 300, and/or perform one or more baseband processing functions (e.g., media access control (MAC), encoding/decoding, modulation/demodulation, data symbol mapping, error correction, etc.); the running of one or more applications and/or operating systems; power management (e.g., battery control and monitoring); display settings; volume control; and/or user interactions via one or more user interfaces (e.g., keyboard, touchscreen display, microphone, speaker, etc.). In an exemplary aspect, the controller 340 can include one or more elements of a protocol stack such as, a physical (PHY) layer, media access control (MAC), radio link control (RLC), packet data convergence protocol (PDCP), and/or radio resource control (RRC) elements. The Non Access Stratum (NAS) is the protocol between the mobile device (UE) and the Mobility Management Entity (MME) and can be configured for authentication operations, security control and/or the generation of paging messages.

The controller 340 can further include a memory 360 that stores data and/or instructions, where when the instructions are executed by the processor circuitry 350, controls the processor circuitry 350 to perform the functions described herein. The memory 360 can store prioritization policies and/or prioritization operating modes. The memory 360 can be any well-known volatile and/or non-volatile memory, and can be non-removable, removable, or a combination of both.

In an exemplary aspect, the mobile device 140 can include two or more subscriber identity modules (SIMs) configured for Dual-SIM Dual-Standby (DSDS) operation, (DR)-DSDS operation, and/or Dual-SIM caller identification (DSCID) operation. For example, the SIM interface 370 can be configured to interface with a first SIM 375 and a second SIM 380.

The first SIM1 375 can support wireless communications (e.g., 2G/3G/4G) on a first wireless network (e.g., cell/sector 110) and a second SIM2 380 can support wireless communications (e.g., 2G or 2G/3G) on a second wireless network (e.g., cell/sector 112). In an exemplary aspect, the wireless communications on the first wireless network includes LTE communications. In an exemplary aspect, the first SIM1 375 supports Multimedia Broadcast Multicast Services (MBMS), including Evolved Multimedia Broadcast Multicast Services (eMBMS) that deliver broadcast and multicast services through using LTE.

To avoid a possible interruption for the eMBMS communication, in an exemplary aspect, the mobile device 140 can be configured to manage eMBMS service preferences to prioritize eMBMS over one or more connected mode services on one or more other SIMs in the DSDS/DR-DSDS configuration. In an exemplary aspect, the first SIM1 375 and/or the second SIM2 380 can be configured to support eMBMS.

For example, in aspects where the SIM1 375 supports an active eMBMS communication and, for example, a mobile terminated call (e.g., incoming voice call, incoming email, etc.) is paged by the network supported by the second SIM2 380, the eMBMS communication utilizing the SIM1 375 may be interrupted and/or dropped. That is, the eMBMS would be dropped to support a connected mode service on the other SIM.

The controller 340 can be configured to manage eMBMS prioritizations to allow the mobile device 140 to prioritize eMBMS on one of SIM1 375 and SIM2 380. This prioritization can be used to prevent, for example, an active eMBMS communication supported by SIM1 375 from being interrupted by a mobile terminated call (e.g., incoming voice call, incoming email, etc.) is paged by the network supported by the second SIM2 380.

In an exemplary aspect, the controller 340 includes a service priority determination processor 325 configured to manage one or more prioritization policies to control the mobile device 140 to prioritize eMBMS on one of the SIM1 375 and SIM2 380. The prioritization policies can include one or more policies to prioritize eMBMS communications. In an exemplary aspect, the service priority determination processor 325 includes processor circuitry configured to perform one or more functions and/or operations of the service priority determination processor 325, including managing eMBMS prioritizations.

In an exemplary aspect, the management and prioritization of eMBMS service preferences is implemented without adding additional resources (processing power, memory, and/or additional hardware) and/or DSDA related hardware (e.g., another transceiver) as found in DSDA configurations.

In an exemplary aspect, the mobile device 140 includes a multi-network SIM that is configured to support the first and the second wireless networks (and in some aspects, a third or more networks). In this example, the controller 340 can be configured to manage eMBMS prioritizations to allow the mobile device 140 to prioritize eMBMS on one of the first or second networks. This prioritization can be used to prevent, for example, an active eMBMS communication supported by the first network from being interrupted by a mobile terminated call (e.g., incoming voice call, incoming email, etc.) that is paged by the second network.

Figure 3B:
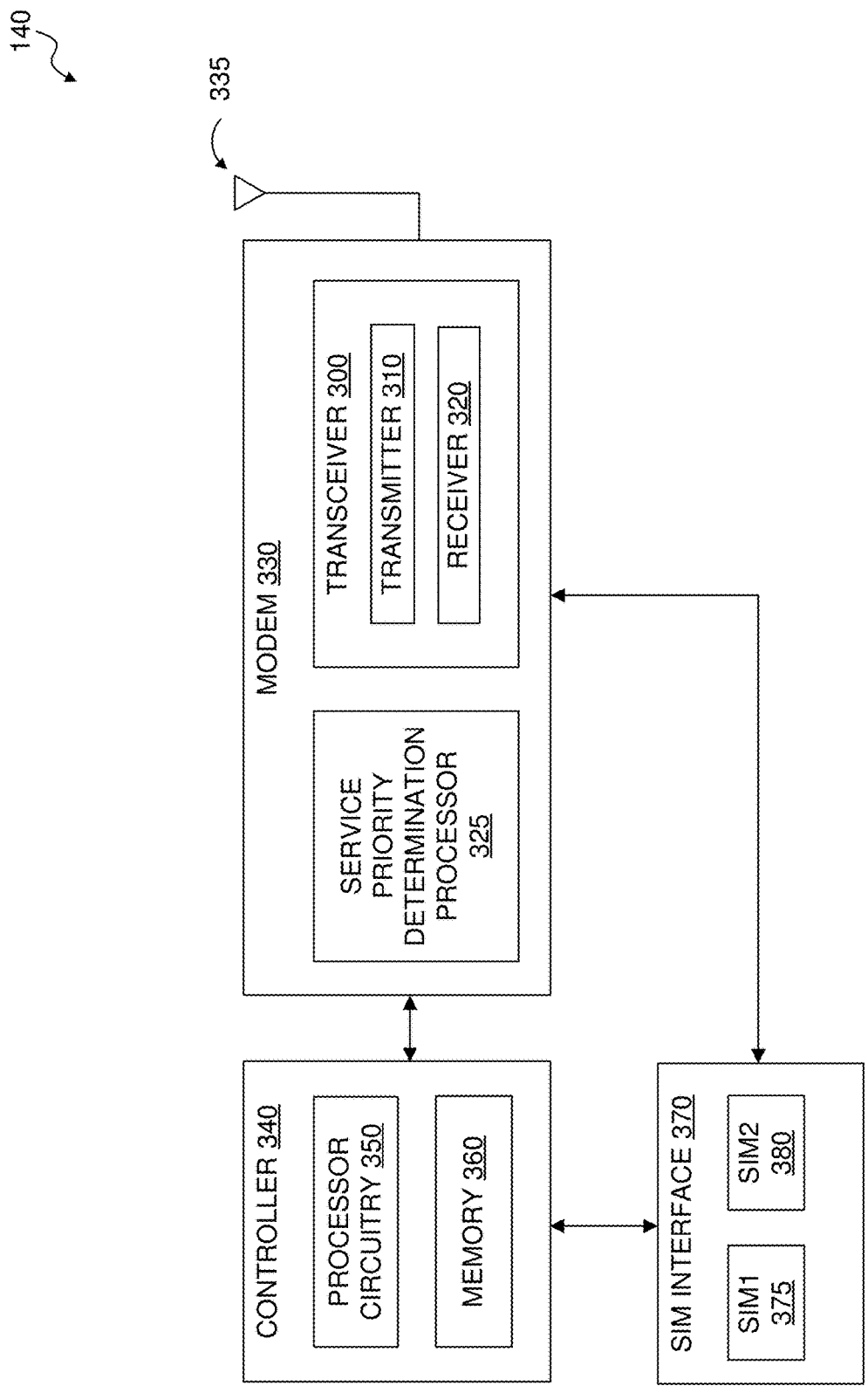

With reference to FIG. 3B, instead of the service priority determination processor 325 being implemented within the controller 340, the service priority determination processor 325 can be included within modem 330 of the mobile device 140. The modem 330 can also include transceiver 300. This configuration is further illustrated in FIGS. 4 and 5. The modem 330 can be configured for transmitting and/or receiving wireless communications conforming to one or more wireless protocols. In an exemplary aspect, the modem 330 includes processor circuitry that is configured for transmitting and/or receiving the wireless communications. The modem 330 can additionally or alternatively be configured to perform digital signal processing (e.g., using a digital signal processor (DSP)), modulation and/or demodulation (using modulator/demodulator), a digital-to-analog conversion (DAC) and/or an analog-to-digital conversion (ADC) (using a respective DA and AD converter), an encoding/decoding (e.g., using encoders/decoders having convolution, tail-biting convolution, turbo, Viterbi, and/or Low Density Parity Check (LDPC) encoder/decoder functionality), frequency conversion (using, for example, mixers, local oscillators, and filters), Fast-Fourier Transform (FFT), preceding, and/or constellation mapping/de-mapping to transmit and/or receive wireless communications conforming to one or more wireless protocols.

Figure 4:
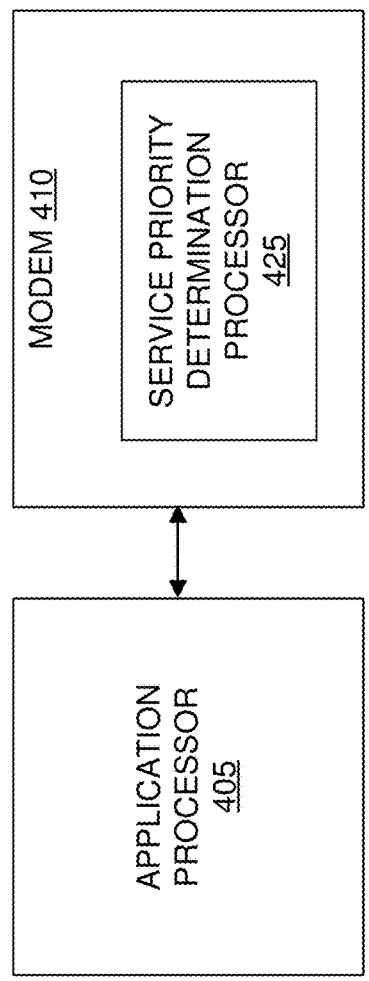

FIG. 4 illustrates the mobile device 140 according to an exemplary aspect of the present disclosure. The mobile device 140 can include an application processor 405 communicatively coupled to one or more modems 410 configured to transmit and/or receive wireless communications via one or more wireless technologies within the communication environment 100.

The modem 410 can be configured for transmitting and/or receiving wireless communications conforming to one or more wireless protocols. In an exemplary aspect, the modem 410 includes processor circuitry that is configured for transmitting and/or receiving the wireless communications. In an exemplary aspect, the modem 410 is an embodiment of the modem 330.

In an exemplary aspect, the modem 410 includes service priority determination processor 425. The service priority determination processor 425 can be configured to manage eMBMS prioritizations to control the mobile device 140 to prioritize eMBMS on one of the SIMs configured for Dual-SIM Dual-Standby (DSDS) operation, (DR)-DSDS operation, and/or Dual-SIM caller identification (DSCID) operation. The service priority determination processor 425 can be an exemplary aspect of the service priority determination processor 325.

The modem 410 can be further include (but is not limited to) a digital signal processer (DSP), modulator and/or demodulator, a digital-to-analog converter (DAC) and/or an analog-to-digital converter (ADC), an encoder/decoder (e.g., encoders/decoders having convolution, tail-biting convolution, turbo, Viterbi, and/or Low Density Parity Check (LDPC) encoder/decoder functionality), a frequency converter (including mixers, local oscillators, and filters), Fast-Fourier Transform (FFT), precoder, and/or constellation mapper/de-mapper that can be utilized in transmitting and/or receiving of wireless communications.

The application processor 405 can be configured to control the execution of one or more applications and/or control the operation of one or more applications. Additionally or alternatively, the application processor 405 can be configured to control the overall operation of the mobile device 140, such as the operation of the modem 410—including, for example, transmitting and/or receiving of wireless communications via the modem 410, and/or perform one or more baseband processing functions (e.g., media access control (MAC), encoding/decoding, modulation/demodulation, data symbol mapping, error correction, etc.).

The application processor 405 can further include a memory (not shown) that stores data and/or instructions, where when the instructions are executed by the application processor 405, controls the application processor 405 to perform the functions described herein. The memory can store prioritization policies and/or prioritization operating modes. The memory can be any well-known volatile and/or non-volatile memory, and can be non-removable, removable, or a combination of both. In an exemplary aspect, the application processor 405 includes processor circuitry configured to perform one or more functions and/or operations of the application processor 405.

In one or more exemplary aspects, the controller 340, service priority determination processor 325, service priority determination processor 425 and/or arbitration sever 525 (discussed below) can be configured to manage one or more communication prioritizations, including one or more MBMS and/or eMBMS prioritizations to control the mobile device 140 to prioritize MBMS/eMBMS on one of the SIMs configured for Dual-SIM Dual-Standby (DSDS) operation, (DR)-DSDS operation, and/or Dual-SIM caller identification (DSCID) operation.

In an exemplary aspect, the MBMS/eMBMS prioritizations can include multiple prioritizations modes. For example, the communication prioritizations can include three operating modes:

1. MBMS/eMBMS full preference
2. MBMS/eMBMS preference
3. No MBMS/eMBMS preference In the MBMS/eMBMS full preference operating mode, communication prioritization is given to MBMS/eMBMS communication services without exception. This mode is similar to deactivating the other SIM (i.e., the second SIM that is idle during the MBMS/eMBMS communications on the first SIM). That is, in a MBMS/eMBMS full preference operating mode, the mobile device 140 is similarly configured as if it was a single SIM phone.

In the MBMS/eMBMS preference operating mode, communication prioritization is given to MBMS/eMBMS communication services with one or more exceptions. For example, in this operating mode, one or more services on an alternative SIM (e.g., SIM2) are allowed to overrule a current MBMS/eMBMS communication service operating on a first SIM (e.g., SIM1). The services that can be allowed to overrule a current MBMS/eMBMS communication service can include, for example (but are not limited to), emergency services, a voice call, a voice call from one or more selected contacts, one or more communications (e.g., call, email, message, text message, etc.) from one or more selected contacts, and/or one or more other services as would be understood by one of ordinary skill in the relevant arts.

In the No MBMS/eMBMS preference operating mode, communication prioritization is not given to MBMS/eMBMS communication services. That is, other services on an alternate SIM (SIM2) are allowed to interrupt a MBMS/eMBMS communication service on the current SIM (SIM1).

In an exemplary aspect, the MBMS/eMBMS prioritization operating modes are predetermined and implemented by the controller 340, service priority determination processor 325, service priority determination processor 425 and/or arbitration sever 525. In this example, exceptions can also be predetermined and/or can be set and/or adjusted by a user of the mobile device 140 using, for example, the application processor 405/controller 340.

In an exemplary aspect, the MBMS/eMBMS prioritization operating modes can be defined by the user of the mobile device 140 additionally or alternatively to the operating modes being predetermined and set in the mobile device. In this example, the user of the mobile device 140 can set and/or adjust the operating modes and/or one or more communication service exceptions via an input/output interface of the mobile device.

In an exemplary aspect, the MBMS/eMBMS prioritization operating modes and/or communication service exceptions can be set and/or adjusted by one or more service providers supporting one or more communications of the mobile device 140.

In an exemplary aspect, the MBMS/eMBMS prioritization operating modes and/or communication service exceptions can be automatically set and/or adjusted based on one or more conditions, including (but not limited to), for example: date, time, location of the mobile device, movement of the mobile device, battery life of the mobile device, remaining allotted data for the user's communication service plan, the current user of the mobile device, which communication protocols and/or service providers are supporting communications on the mobile device, the quality of service provided by one or more communication networks supporting the mobile device, and/or one or more other conditions as would be understood by one of ordinary skill in the relevant arts.

Figure 5:
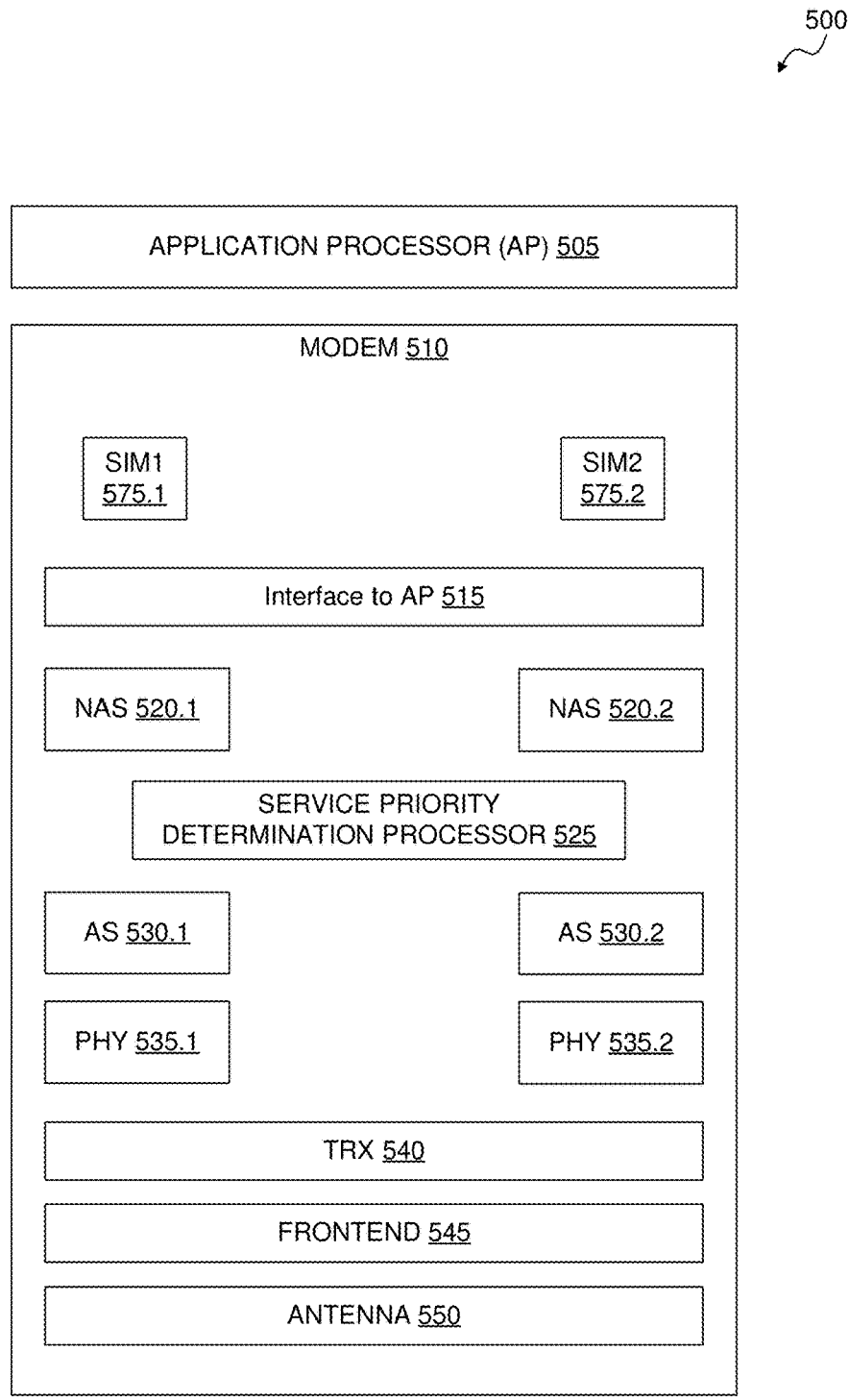
FIG. 5 illustrates a device architecture according to an exemplary aspect of the present disclosure.

FIG. 5 illustrates a device architecture 500 according to an exemplary aspect of the present disclosure. The device architecture 500 can be an embodiment of the mobile device 140. The architecture 500 illustrates a protocol stack according to an exemplary aspect of the mobile device 140.

The device architecture 500 includes application processor (AP) 505 and modem 510. The application processor 505 and the modem 510 can be exemplary aspects of the application processor 405 and modem 410, respectively.

The modem 510 includes first and second SIMs 575.1 and 575.2, an interface 515 configured to interface with the AP 505, first and second non-access stratum (NAS) 520.1 and 520.2, service priority determination processor 525, first and second access stratum (AS) 530.1 and 530.2, first and second physical layers (PHY) 535.1 and 535.2, transceiver 540, frontend 545, and antenna 550. In other aspects, the modem 510 can include a single SIM configured for two or more RATs (e.g., multi-network SIM). In this example, the SIM will interface with the NAS 520.1, NAS 520.2, AS 530.1, and AS 530.2.

The NAS 520 is a function layer in the protocol stack and is configured to manage the establishment of communication sessions and to maintain continuous communications with the mobile device as it moves. The AS 530 is a function layer in the protocol stack and is configured to transport data over the wireless connection and manage radio resources. The PHY 535 is a function layer in the protocol stack configured to control the transmission and receiving of communications. The PHY 535 can include one or more network hardware elements. The transceiver 540 is a function layer in the protocol stack representing the functions of the transceiver (e.g., transceiver 300). The frontend 545 represents the function of radio transmit and/or receive circuitry of the protocol stack. The frontend 545 can be configured to perform one or more radio functions such as filtering, amplifying, mixing, modulation/demodulation, frequency conversion, coding/decoding, and/or one or more other radio functions as would be understood by one of ordinary skill in the relevant arts. The antenna 550 is a function layer in the protocol stack representing the functions of the antenna (e.g., antenna 335).

The service priority determination processor 525 is a function layer in the protocol stack representing the functions and operations of the arbitration sever 325, arbitration sever 425, and/or the arbitration serving functions of the controller 340. The service priority determination processor 525 can be configured to can be configured to manage one or more communication prioritizations, including one or more MBMS and/or eMBMS prioritizations to control the mobile device 140 to prioritize eMBMS on one of the SIMs configured for Dual-SIM Dual-Standby (DSDS) operation, (DR)-DSDS operation, and/or Dual-SIM caller identification (DSCID) operation. The position of the service priority determination processor 525 within the protocol stack is not limited to the position between the NAS 520 and AS 530, and can be configured in another position of the protocol stack as would be understood by one of ordinary skill in the relevant arts. For example, the service priority determination processor 525 can be positioned on a lower layer between the PHY 535 and the TRX 540.

Figure 6:
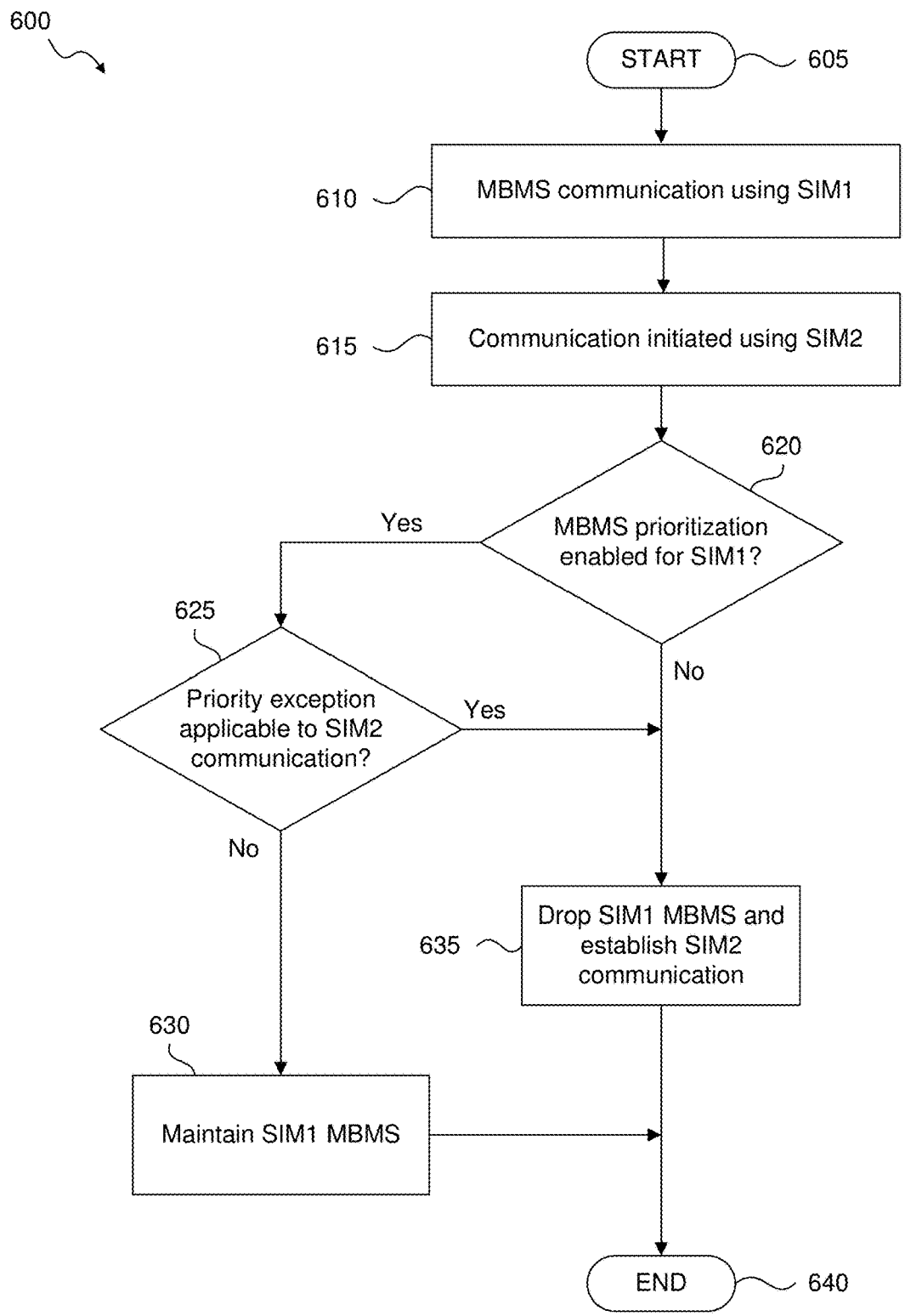
FIG. 6 illustrates a communication method according to an exemplary aspect of the present disclosure.

FIG. 6 illustrates a communication prioritization method 600 according to an exemplary aspect of the present disclosure. The flowchart is described with continued reference to FIGS. 1-5. The operations of the method are not limited to the order described below, and the various operations may be performed in a different order. Further, two or more operations of the method may be performed simultaneously with each other.

The method of flowchart 600 begins at operation 605 and transitions to operation 610, where the mobile device 140 establishes an MBMS/eMBMS communication service supported by a first SIM (e.g., SIM1 375) and/or a first RAT.

After operation 610, the method of flowchart 600 transitions to operation 615, where a communication (e.g., incoming call, email, etc.) supported by the second SIM (e.g., SIM2 380) and/or a second RAT is to be initiated.

After operation 615, the method of flowchart 600 transitions to operation 620, where it is determined whether MBMS/eMBMS communication prioritization has been enabled. That is, it is determined whether the MBMS/eMBMS communication service on the first SIM/RAT has priority/preference over the communication service on the second SIM/RAT. The controller 340 or service priority determination processor 325/425/525 can be configured to determine whether MBMS/eMBMS communication prioritization has been enabled.

If the MBMS/eMBMS communication prioritization has not been enabled (No at operation 620), the flowchart 600 transitions to operation 635, where the MBMS/eMBMS communication service on the first SIM/RAT is interrupted and/or dropped and the communication service supported by the second SIM/RAT is established. After operation 635, the flowchart transitions to operation 640, where the flowchart 600 ends.

If the MBMS/eMBMS communication prioritization has been enabled (Yes at operation 620), the flowchart 600 transitions to operation 625, where it is determined whether prioritization exceptions are enabled and if the communication service supported by the second SIM/RAT is a service that is allowed to overrule a prioritization of MBMS/eMBMS communication services. The controller 340 or service priority determination processor 325/425/525 can be configured to determine whether prioritization exceptions are enabled and if the communication service supported by the second SIM/RAT is a service that is allowed to overrule a prioritization of MBMS/eMBMS communication services.

If the prioritization exceptions are enabled and the communication service supported by the second SIM/RAT is a service that is allowed to overrule a prioritization of MBMS/eMBMS communication services (Yes at operation 625), the flowchart 600 transitions to operation 635, where the MBMS/eMBMS communication service on the first SIM/RAT is interrupted and/or dropped and the communication service supported by the second SIM/RAT is established.

If the prioritization exceptions are not enabled, or if they are enabled but the communication service supported by the second SIM/RAT is not a service that is allowed to overrule a prioritization of MBMS/eMBMS communication services (No at operation 625), the flowchart 600 transitions to operation 630, where the MBMS/eMBMS communication service supported by a first SIM/RAT is maintained and the communication service supported by the second SIM/RAT is dropped. After operation 630, the flowchart transitions to operation 640, where the flowchart 600 ends. The flowchart 600 may be repeated for a subsequent communication service.

EXAMPLES

Example 1 is a communication method for a communication device configured to communicate using a first radio access technology (RAT) and a second RAT, comprising: establishing a Multimedia Broadcast Multicast Service (MBMS) communication using the first RAT; initiating a second communication using the second RAT; determining whether the MBMS communication is prioritized over the second communication being initiated using the second RAT; and controlling the communication device to manage the MBMS communication and the second communication based on the determination.

In Example 2, the subject matter of Example 1, wherein controlling the communication device to manage the MBMS communication and the second communication comprises:

maintaining the MBMS communication if it is determined that the MBMS communication is prioritized over the second communication; and dropping the MBMS communication and establishing the second communication if it is determined that the MBMS communication is not prioritized over the second communication.

In Example 3, the subject matter of Example 1, further comprising: determining whether the second communication is a type of communication allowed to override a prioritization of the MBMS communication, wherein controlling the communication device to manage the MBMS communication and the second communication is further based on the determination of whether the second communication is the type of communication allowed to override the prioritization of the MBMS communication.

In Example 4, the subject matter of Example 3, wherein the type of communication allowed to override the prioritization of the MBMS communication comprises an emergency service communication.

In Example 5, the subject matter of Example 3, wherein the type of communication allowed to override the prioritization of the MBMS communication is configurable by a user of the communication device.

In Example 6, the subject matter of Example 3, wherein the type of communication allowed to override the prioritization of the MBMS communication is predetermined by the communication device or a service provider associated with the first RAT.

In Example 7, the subject matter of Example 3, wherein the MBMS communication comprises an Evolved Multimedia Broadcast Multicast Services (eMBMS) communication.

In Example 8, the subject matter of Example 1, wherein the communication device is a multi-subscriber identity module (SIM) communication device configured to interface with a first SIM and a second SIM, the first RAT being supported by the first SIM and the second RAT being supported by the second SIM.

In Example 9, the subject matter of Example 8, wherein the communication device is configured for Dual-SIM Dual-Standby (DSDS) operation or Dual Receive (DR)-DSDS operation.

In Example 10, the subject matter of Example 1, wherein communication device is configured to interface with a subscriber identity module (SIM) configured to support the first RAT and the second RAT.

Example 11 is a communication device configured to communicate using a first radio access technology (RAT) and a second RAT, comprising: a transceiver configured to transmit or receive communications based on the first RAT and the second RAT; and a controller configured to: establish, using the transceiver, a Multimedia Broadcast Multicast Service (MBMS) communication using the first RAT; initiate, using the transceiver, a second communication using the second RAT; determine whether the MBMS communication is prioritized over the second communication; and manage the MBMS communication and the second communication based on the determination.

In Example 12, the subject matter of Example 11, wherein the controller configured to: maintain the MBMS communication if it is determined that the MBMS communication is prioritized over the second communication; and drop the MBMS communication and establish the second communication, using the transceiver, if it is determined that the MBMS communication is not prioritized over the second communication.

In Example 13, the subject matter of Example 11, wherein the controller is further configured to: determine whether the second communication is a type of communication allowed to override a prioritization of the MBMS communication; and manage the MBMS communication and the second communication based further on the determination of whether the second communication is the type of communication allowed to override the prioritization of the MBMS communication.

In Example 14, the subject matter of Example 13, wherein the type of communication allowed to override the prioritization of the MBMS communication comprises an emergency services communication.

In Example 15, the subject matter of Example 13, wherein the type of communication allowed to override the prioritization of the MBMS communication is configurable by a user of the communication device.

In Example 16, the subject matter of Example 13, wherein the type of communication allowed to override the prioritization of the MBMS communication is predetermined by the communication device or a service provider associated with the first RAT.

In Example 17, the subject matter of Example 13, wherein the MBMS communication comprises an Evolved Multimedia Broadcast Multicast Services (eMBMS) communication.

In Example 18, the subject matter of Example 11, wherein communication device is a multi-subscriber identity module (SIM) communication device configured to interface with a first SIM and a second SIM, the first RAT being supported by the first SIM and the second RAT being supported by a second SIM.

In Example 19, the subject matter of Example 18, wherein the communication device is configured for Dual-SIM Dual-Standby (DSDS) operation or Dual Receive (DR)-DSDS operation.

In Example 20, the subject matter of Example 11, wherein communication device is configured to interface with a subscriber identity module (SIM) configured to support the first RAT and the second RAT.

Example 21 is a communication device configured to communicate using a first radio access technology (RAT) and a second RAT, comprising: a transceiver configured to transmit or receive communications based on the first RAT and the second RAT; a processor configured to control the transceiver to establish a Multimedia Broadcast Multicast Service (MBMS) communication using the first RAT; and a service priority determination processor configured to prioritize the MBMS communication over a second communication being initiated using the second RAT based on a prioritization policy.

In Example 22, the subject matter of Example 21, wherein the service priority determination processor is configured to control the processor to: maintain the MBMS communication if the service priority determination processor determines that the MBMS communication is to be prioritized over the second communication; and drop the MBMS communication and establish the second communication, using the transceiver, if the service priority determination processor determines that the MBMS communication is not prioritized over the second communication.

In Example 23, the subject matter of Example 21, wherein communication device is a multi-subscriber identity module (SIM) communication device configured to interface with a first SIM and a second SIM, the first RAT being supported by the first SIM and the second RAT being supported by a second SIM.

In Example 24, the subject matter of Example 23, wherein the communication device is configured for Dual-SIM Dual-Standby (DSDS) operation or Dual Receive (DR)-DSDS operation.

In Example 25, the subject matter of Example 21, wherein communication device is configured to interface with a subscriber identity module (SIM) configured to support the first RAT and the second RAT.

In Example 26, the subject matter of any of Examples 1-7, wherein the communication device is a multi-subscriber identity module (SIM) communication device configured to interface with a first SIM and a second SIM, the first RAT being supported by the first SIM and the second RAT being supported by the second SIM.

In Example 27, the subject matter of Example 26, wherein the communication device is configured for Dual-SIM Dual-Standby (DSDS) operation or Dual Receive (DR)-DSDS operation.

In Example 28, the subject matter of any of Examples 1-7, wherein communication device is configured to interface with a subscriber identity module (SIM) configured to support the first RAT and the second RAT.

Example 29 is a computer program product embodied on a computer-readable medium comprising program instructions, when executed, causes an apparatus to perform the method of any of Examples 1-10.

Example 30 is an apparatus comprising means to perform the method as described in any of Examples 1-10.

Example 31 is a wireless mobile communication device configured to perform the method as described in any of Examples 1-10.

Example 32 is an apparatus substantially as shown and described.

Example 33 is a method substantially as shown and described.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processor circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

As will be apparent to a person of ordinary skill in the art based on the teachings herein, exemplary aspects are not limited to Long-Term Evolution (LTE), and can be applied to other cellular communication standards, including (but not limited to) Evolved High-Speed Packet Access (HSPA+), Wideband Code Division Multiple Access (W-CDMA), CDMA2000, Time Division-Synchronous Code Division Multiple Access (TD-SCDMA), Global System for Mobile Communications (GSM), General Packet Radio Service (GPRS), Enhanced Data Rates for GSM Evolution (EDGE), and Worldwide Interoperability for Microwave Access (WiMAX) (Institute of Electrical and Electronics Engineers (IEEE) 802.16) to provide some examples. Further, exemplary aspects are not limited to cellular communication networks and can be used or implemented in other kinds of wireless communication access networks, including (but not limited to) one or more IEEE 802.11 protocols, Bluetooth, Near-field Communication (NFC) (ISO/IEC 18092), ZigBee (IEEE 802.15.4), and/or Radio-frequency identification (RFID), to provide some examples. Further, exemplary aspects are not limited to the above wireless networks and can be used or implemented in one or more wired networks using one or more well-known wired specifications and/or protocols.

What is claimed is:

1. A communication method for a communication device configured to communicate using a first radio access technology (RAT) and a second RAT, comprising:
   establishing a Multimedia Broadcast Multicast Service (MBMS) using the first RAT;
   initiating a second communication service using the second RAT;
   determining a prioritization mode of the communication device, wherein, prior to establishing the MBMS and initiating the second communication service, the prioritization mode of the communication device having been set from prioritization modes including: a MBMS full preference mode that provides that the MBMS is prioritized over at least the second communication service and that omits a service override, and a MBMS preference mode that provides that the MBMS is prioritized over at least the second communication service and includes the service override;
   determining a service priority based on the prioritization mode to determine whether the MBMS is prioritized over the second communication service;
   determining whether the prioritization mode includes the service override that controls the initiated second communication service to override the established MBMS; and
   controlling the communication device to manage the MBMS and the second communication service based on the determinations of the service priority and whether the prioritization mode includes the service override.

2. The communication method of claim 1, wherein controlling the communication device to manage the MBMS and the second communication service comprises:
   maintaining the MBMS if the service priority provides that the MBMS is prioritized over the initiated second communication service and if the prioritization mode omits the service override; and
   dropping the MBMS and establishing the initiated second communication service if the service priority provides that the MBMS is not prioritized over the second communication service or if the prioritization mode includes the service override.

3. The communication method of claim 1, wherein the service override provides that emergency services are allowed to override the MBMS, and the second communication service is allowed to override the MBMS if the initiated second communication service is an emergency service communication.

4. The communication method of claim 1, wherein the prioritization mode is configurable by a user of the communication device.

5. The communication method of claim 1, wherein the prioritization mode is predetermined by a service provider associated with the first RAT.

6. The communication method of claim 1, wherein the MBMS comprises an Evolved Multimedia Broadcast Multicast Services (eMBMS) communication.

7. The communication method of claim 1, wherein the communication device is a multi-subscriber identity module (SIM) communication device configured to interface with a first SIM and a second SIM, the first RAT being supported by the first SIM and the second RAT being supported by the second SIM.

8. The communication method of claim 7, wherein the communication device is configured for Dual-SIM Dual-Standby (DSDS) operation or Dual Receive (DR)-DSDS operation.

9. The communication method of claim 1, wherein communication device is configured to interface with a subscriber identity module (SIM), the SIM being configured to support the first RAT and the second RAT.

10. The communication method of claim 1, wherein the prioritization mode is predetermined by the communication device.

11. A communication device configured to communicate using a first radio access technology (RAT) and a second RAT, comprising:
    a transceiver configured to transmit or receive communications based on the first RAT and the second RAT; and
    a controller configured to:
    establish, using the transceiver, a Multimedia Broadcast Multicast Service (MBMS) using the first RAT;
    initiate, using the transceiver, a second communication service using the second RAT;
    determine a prioritization mode of the communication device, wherein, prior to establishing the MBMS and initiating the second communication service, the prioritization mode of the communication device having been set from prioritization modes including: a MBMS full preference mode that provides that the MBMS is prioritized over at least the second communication service and that omits a service override, and a MBMS preference mode that provides that the MBMS is prioritized over at least the second communication service and includes the service override;
    determine a service priority based on the prioritization mode to determine whether the MBMS is prioritized over the second communication service;
    determine whether the prioritization mode includes the service override that controls the initiated second communication service to override the established MBMS; and
    manage the MBMS and the second communication service based on the determinations of the service priority and the whether the prioritization mode includes the service override.

12. The communication device of claim 11, wherein the controller configured to:
    maintain the MBMS if the service priority provides that the MBMS is prioritized over the initiated second communication service and if the prioritization mode omits the service override; and
    drop the MBMS and establish the initiated second communication service, using the transceiver, if the service priority provides that the MBMS is not prioritized over the initiated second communication service or if the prioritization mode includes the service override.

13. The communication device of claim 11, wherein the service override provides that emergency services are allowed to override the MBMS, and the second communication service is allowed to override the MBMS if the initiated second communication is an emergency services communication.

14. The communication device of claim 11, wherein the prioritization mode is configurable by a user of the communication device.

15. The communication device of claim 11, wherein the prioritization mode is predetermined by a service provider associated with the first RAT.

16. The communication device of claim 11, wherein the MBMS comprises an Evolved Multimedia Broadcast Multicast Services (eMBMS) communication.

17. The communication method of claim 11, wherein communication device is a multi-subscriber identity module (SIM) communication device configured to interface with a first SIM and a second SIM, the first RAT being supported by the first SIM and the second RAT being supported by a second SIM.

18. The communication device of claim 17, wherein the communication device is configured for Dual-SIM Dual-Standby (DSDS) operation or Dual Receive (DR)-DSDS operation.

19. The communication method of claim 11, wherein communication device is configured to interface with a subscriber identity module (SIM), the SIM being configured to support the first RAT and the second RAT.

20. A communication device configured to communicate using a first radio access technology (RAT) and a second RAT, comprising:
   a transceiver configured to transmit or receive communications based on the first RAT and the second RAT;
   a first processor configured to control the transceiver to establish a Multimedia Broadcast Multicast Service (MBMS) using the first RAT, and initiate a second communication service that uses the second RAT; and
   a second processor configured to:
   determine a prioritization mode of the communication device, wherein, prior to establishing the MBMS and initiating the second communication service, the prioritization mode of the communication device having been set from prioritization modes including: a MBMS full preference mode that provides that the MBMS is prioritized over at least the second communication service and that omits a priority exception, and a MBMS preference mode that provides that the MBMS is prioritized over at least the second communication service and includes the priority exception;
   determine a prioritization policy defining priorities of services based on the prioritization mode to determine if the established MBMS is prioritized over the initiated second communication service; and
   determine if the prioritization mode includes the priority exception that controls the initiated second communication service to overrule a determination that the MBMS is prioritized over the initiated second communication.

21. The communication method of claim 20, wherein communication device is a multi-subscriber identity module (SIM) communication device configured to interface with a first SIM and a second SIM, the first RAT being supported by the first SIM and the second RAT being supported by a second SIM.

22. The communication device of claim 21, wherein the communication device is configured for Dual-SIM Dual-Standby (DSDS) operation or Dual Receive (DR)-DSDS operation.

23. The communication method of claim 20, wherein communication device is configured to interface with a subscriber identity module (SIM), and the SIM is configured to support the first RAT and the second RAT.

* * * * *